No. 646,140. Patented Mar. 27, 1900.
W. CORLISS.
WHEEL TIRE.
(Application filed Apr. 12, 1899.)
(No Model.)
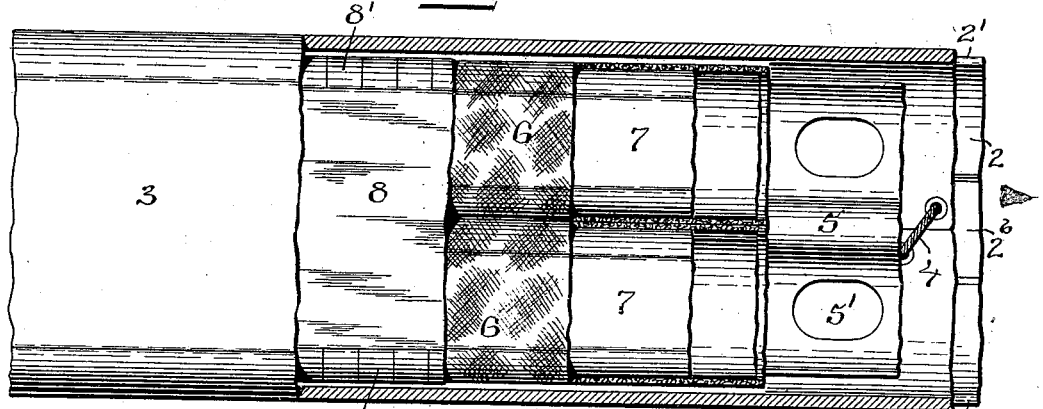
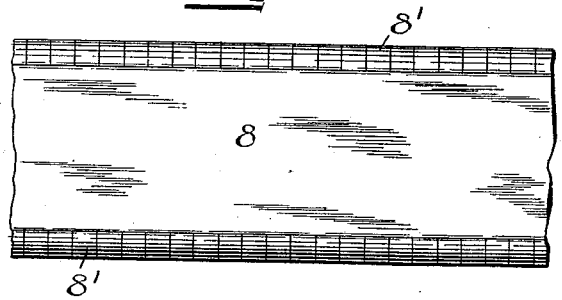
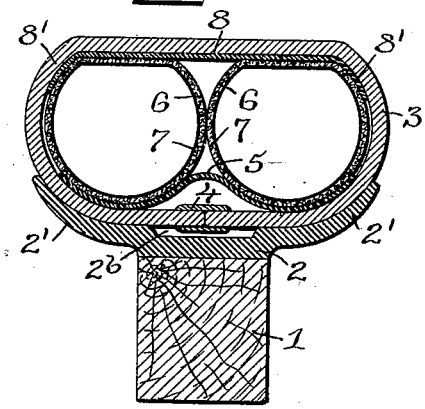
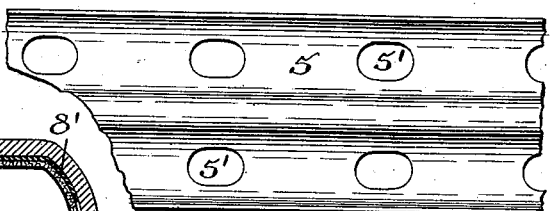
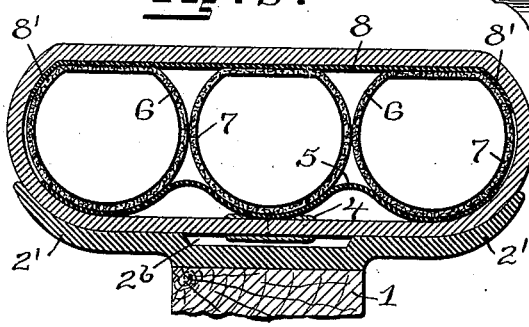
WITNESSES:
Chas. H. Luther Jr.
B. M. Simms
INVENTOR:
William Corliss
by Joseph A. Miller & Co.
Attys.
THE NORRIS PETERS CO., PHOTO-LITHO., WASHINGTON, D. C.

UNITED STATES PATENT OFFICE.

WILLIAM CORLISS, OF PROVIDENCE, RHODE ISLAND.

WHEEL-TIRE.

SPECIFICATION forming part of Letters Patent No. 646,140, dated March 27, 1900.

Application filed April 12, 1899. Serial No. 712,724. (No model.)

*To all whom it may concern:*

Be it known that I, WILLIAM CORLISS, of Providence, in the county of Providence and State of Rhode Island, have invented a new and useful Improvement in Wheel-Tires; and I hereby declare that the following is a full, clear, and exact description of the same, reference being had to the accompanying drawings, forming part of this specification.

When pneumatic or cushion tires are to be used on automotor and other carriages, it is desirable to give to the elastic tire a sufficient base to secure a broad contact with the road to prevent the lateral swaying and uneasy motion of the carriage, as well as to secure sufficient adhesion of the driving-wheels of the automotor carriages with the road-bed.

Pneumatic and other elastic tires, when they have a considerable vertical depth, such as is the case when a single large tube is used, are subjected when the wheels are used to propel the carriage to great and excessive strain between the bearing of the elastic tire on the wheel or rim and the ground, and such tires are not durable.

The object of this invention is to provide a pneumatic tire which, while it secures a wide base contact with the ground, will not greatly increase the diameter of the wheel and will not be subjected to excessive strain when used on the driving-wheel of a motor-vehicle.

The invention consists in the peculiar and novel construction of the tire, whereby two or more independent non-elastic tubes are supported on a bolster protected by an armor-hoop and inclosed in a cover, as will be more fully set forth hereinafter.

Figure 1 is a top view of my improved tire, partly in section, so as to show more clearly the different parts of which the tire is composed. Fig. 2 is a transverse sectional view showing the rim of the tire secured to the felly of a wheel. Fig. 3 is a top view of part of the armor-ring. Fig. 4 is a top view of part of the bolster-rim. Fig. 5 is a transverse sectional view of a form of a tire, showing three tubes placed side by side inclosed in a cover.

Similar numerals of reference indicate corresponding parts in all the figures.

In the drawings, 1 indicates the felly of a wheel; 2, a metallic rim supported on the felly; $2'$ $2'$, concavo-convex flanges projecting on each side beyond the felly, and $2^b$ a central groove in the rim 2; 3, a non-elastic flexible cover secured together along the center by the lacing 4, and 5 a concavo-convex bolster bearing on the cover 3 on the opposite flanges $2'$ $2'$ of the metal rim 2 and forming a concave supporting-surface for the non-expansible textile tubes 6. The bolster 5 is perforated with the holes $5'$ below each one of the tubes 6 6. A thin rubber air-tube 7 is placed in each one of the tubes 6 6, and these air-tubes are connected each with the usual valve-tube used for inflating bicycle-tubes. The sheet-steel ring 8, provided with the cut edges forming the flexible leaves $8'$ $8'$, encircles the non-elastic tubes 6 6 and is of a transverse width sufficient to cover the number of tubes 6 6 that may be contained in the tire. When this tire is to be secured to the wheel, the cover 3 is placed around the tubes 6 6, the armor-ring 8, and the bolster 5, the tubes 6 6 being only partially filled with air. The cover containing the ring 8, the tubes 6 6, and the bolster 5 may be placed over the raised margins of the rim 2 of the wheel. The tubes 6 6 are now inflated by air under pressure until the tubes are partially flattened by the surrounding armor-ring 8, and the bolster 5 is firmly pressed against the cover, thereby securing the cover between the bolster and the flanges $2'$ of the rim 2. By this method of construction an elastic wheel-tire of any desired width may be produced by the use of two, three, or more of the non-expansible fabric tubes 6 6 without increasing the vertical depth of the tire, so that without materially raising the carriage wheels of the ordinary construction and usual diameter may be used and also so that the tires may be applied to the present form of carriage-wheels without materially raising the body of the carriage. The wide base of the elastic tire supported on the projecting flanges of the metallic rim insures a firm support of a considerable width to the carriage-wheels and prevents the swaying lateral motion of the carriage produced by a single-tube tire of large diameter. The curved form of the bolster 5 secures a firm support for the tubes 6 and retains the several tubes in their respective positions.

Having thus described my invention, I claim as new and desire to secure by Letters Patent—

1. In a wheel-tire, the combination with the rim 2 having the outwardly and upwardly extending curved flanges 2', of the bolster 5 curved to correspond with the curved flanges of the rim and the tubes 6, the non-elastic fabric tubes 6, the air-tubes 7 for expanding the fabric tubes 6, the armor-ring 8 and the cover 3; whereby two or more fabric tubes may be inclosed in one cover and a tire of any desired width produced, as described.

2. In a pneumatic wheel-tire, in combination, the two or more non-elastic fabric tubes, air-tubes within the non-elastic fabric tubes, a bolster transversely curved to correspond with the tubular form of the non-elastic fabric tubes, an inclosing cover, and a metallic rim forming the support of the two or more non-elastic fabric tubes; whereby a pneumatic tire of any desired width may be constructed of a series of tubes of small diameter, as described.

3. In a wheel-tire, the combination with two or more flexible non-expansible tubes, the expansible air-tube, the steel ring having the margins separated into plates, and the bolster curved transversely to form a seat for each of the flexible non-expansible tubes, of the fellies of the wheel, the metal wheel-rim having a central groove and laterally-projecting flanges curved to correspond with the bolster and the flexible cover secured together by lacing; whereby the pneumatic tire is supported practically across its whole width by the series of flexible non-expansible tubes, as described.

4. In a pneumatic tire, the combination with two or more non-expansible textile tubes placed side by side and air-tubes inclosed in the non-expansible tubes, of a transversely-curved bolster-ring, forming the seat for the non-expansible textile tubes and the fastening for the cover, a metal tread-band extending across two or more of the textile tubes, and a cover inclosing the tread-band and the non-expansible tubes; whereby the tread of the tire is supported by the series of non-expansible tubes, as described.

In witness whereof I have hereunto set my hand.

WILLIAM CORLISS.

Witnesses:
J. A. MILLER, Jr.,
B. M. SIMMS.